United States Patent
Shannon et al.

(10) Patent No.: US 6,285,869 B1
(45) Date of Patent: Sep. 4, 2001

(54) METHOD FOR PERFORMING REPLACEMENT OF A SUBSCRIBER IDENTITY MODULE (SIM) IN A MOBILE COMMUNICATIONS NETWORK

(75) Inventors: John Parker Shannon, Dunrobin (CA); Andrew Morgan, Maidenhead (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/011,421
(22) PCT Filed: Aug. 7, 1996
(86) PCT No.: PCT/GB96/01921
§ 371 Date: May 15, 1998
§ 102(e) Date: May 15, 1998
(87) PCT Pub. No.: WO97/06646
PCT Pub. Date: Feb. 20, 1997

(30) Foreign Application Priority Data

Aug. 8, 1995 (GB) .................................................. 9516262

(51) Int. Cl.[7] ..................................................... H04Q 7/20
(52) U.S. Cl. ......................... 455/411; 455/410; 455/551; 455/558
(58) Field of Search ................................. 455/410, 411, 455/434, 450, 464, 551, 557, 558, 186.1, 420; 380/23, 25, 50; 340/825.34

(56) References Cited

U.S. PATENT DOCUMENTS

| 5,557,679 | * | 9/1996 | Julin et al. ........................... 380/23 |
| 5,619,500 | * | 4/1997 | Hiekali ................................ 370/414 |
| 5,675,628 | * | 10/1997 | Hokkanen ........................... 455/558 |
| 5,854,976 | * | 12/1998 | Aguilera et al. ..................... 455/411 |
| 5,864,757 | * | 1/1999 | Parker ................................. 455/418 |
| 5,907,804 | * | 5/1999 | Schroderus et al. ................. 455/411 |
| 5,933,773 | * | 8/1999 | Barvesten ............................ 455/411 |
| 5,956,633 | * | 9/1999 | Janhila ................................ 455/410 |
| 6,044,275 | * | 3/2000 | Boltz et al. ......................... 455/466 |
| 6,144,857 | * | 11/2000 | Price et al. .......................... 455/445 |

FOREIGN PATENT DOCUMENTS

0481714A2 * 10/1991 (EP) ............................. H04Q/7/04
WO 97/01253   1/1997 (WO) .

OTHER PUBLICATIONS

MacCoroni Multi–SIM Card GSM Cellular Telephone pp. 1–4, Mar. 6, 1999.*

* cited by examiner

*Primary Examiner*—Dwayne Bost
*Assistant Examiner*—Jean A Gelin
(74) *Attorney, Agent, or Firm*—Lee, Mann, Smith, McWilliams, Sweeney and Ohlson

(57) ABSTRACT

In a mobile communications network, each subscriber is allocated a unique identity code and is provided with a card (a SIM card) bearing that code which provides subscriber access to the system. A list of identity codes together with corresponding subscriber details are stored in a first store. When a card is to be replaced, a new identity code is created for the subscriber and is stored in the first store and in a second store. A mapping is provided between the new identity code and the corresponding existing subscriber identity code. The new identity code is then associated with the corresponding subscriber details and is activated while the existing code is de-activated.

7 Claims, 2 Drawing Sheets

STEP 1:
SERVICE PROVIDER MANUALLY ADDS ENTRY FOR NEW IMSI

GHLRAUTH  AUTOMATICALLY CREATES ENTRY IN

STEP 2:
SERVICE PROVIDER MANUALLY ADDS ENTRY FOR EXISTING AND NEW IMSI INTO SIM

GHLRSIMR  AUTOMATICALLY UPDATES THE IMSI STATUS OF THE NEW IMSI TO R (REPLACEMENT)

METHOD FOR PERFORMING REPLACEMENT OF A SUBSCRIBER IDENTITY MODULE (SIM) IN A MOBILE COMMUNICATIONS NETWORK

This invention relates to mobile telecommunications systems and to the identification of subscribers in such a system. In particular, the invention relates to the provision of subscriber identity cards whereby subscribers are identified and authorised to use the system.

BACKGROUND OF THE INVENTION

A particular problem in mobile telephone systems to which the public have access is that of fraudulent misuse, the most common form of fraud being the use of stolen or cloned handsets to evade the call billing process. This represents a significant loss of revenue to system operators. An approach to this problem has been the introduction of handsets which require the insertion of a subscriber identity card containing coded information before access to the system is permitted. For example, the GSM system requires the use of a subscriber identity module (SIM) card to allow a mobile terminal to use the system services.

It will be appreciated that a subscriber identity card will have a finite lifetime and will from time to time require replacement on an occasional basis as a result of loss by the subscriber or, more commonly, on a periodic basis to allow for normal wear and tear. This provides a problem to the system operator if security is to be maintained. To prevent fraud, the system is arranged to recognise a unique card for each subscriber. However, this requirement is generally incompatible with the temporary existence of two cards during the replacement operation. One approach to this problem is described in specification No. EP-A2-0481714 and No. GB-A-2248999 which describe the use of a SIM card or smart card to control access to a mobile system. In this arrangement, the first use of a replacement card triggers deletion of the replaced card from the system records. This process however is reliant upon diligence by the subscriber in using the replacement card promptly so that the change can be put into effect.

The object of the invention is to minimise or to overcome this disadvantage.

A further object of the invention is to provide a greater degree of control by the system operator on the card replacement process.

SUMMARY OF THE INVENTION

According to the invention there is provided a method of effecting subscriber identity card replacement in a mobile communications network in which each subscriber is allocated a unique identity code, the method including storing a list of said identity codes together with subscriber details in a first store, creating a new identity code for a said subscriber and storing said new code in said first store and in a second store, providing a mapping between the new identity code and the corresponding existing subscriber identity code, associating timing information with the new identity code, and associating the new identity code with the corresponding subscriber details at, or after, a time determined by the timing information, whereby to activate the new code and deactivate the existing code.

A further aspect of the invention provides an arrangement for effecting subscriber identity card replacement in a mobile communications network in which each subscriber is allocated a unique identity code, the arrangement including a first store for storing a list of said identity codes together with corresponding subscriber details, a second store for storing each said code together with a status indicator whose value determines whether that identity code is activated or deactivated, means for generating a new identity code for a subscriber, for providing a mapping between that new identity code and the corresponding existing subscriber identity code and for associating timing information with the new identity code, and means for associating the new identity code with the corresponding subscriber details at, or after, a time determined by the timing information whereby to activate the new code and deactivate the existing code.

BRIEF DESCRIPTION OF THE DRAWINGS

An embodiment of the invention will now be described with reference to the accompanying drawings in which.

DESCRIPTION OF PREFERRED EMBODIMENT

Figure 1:
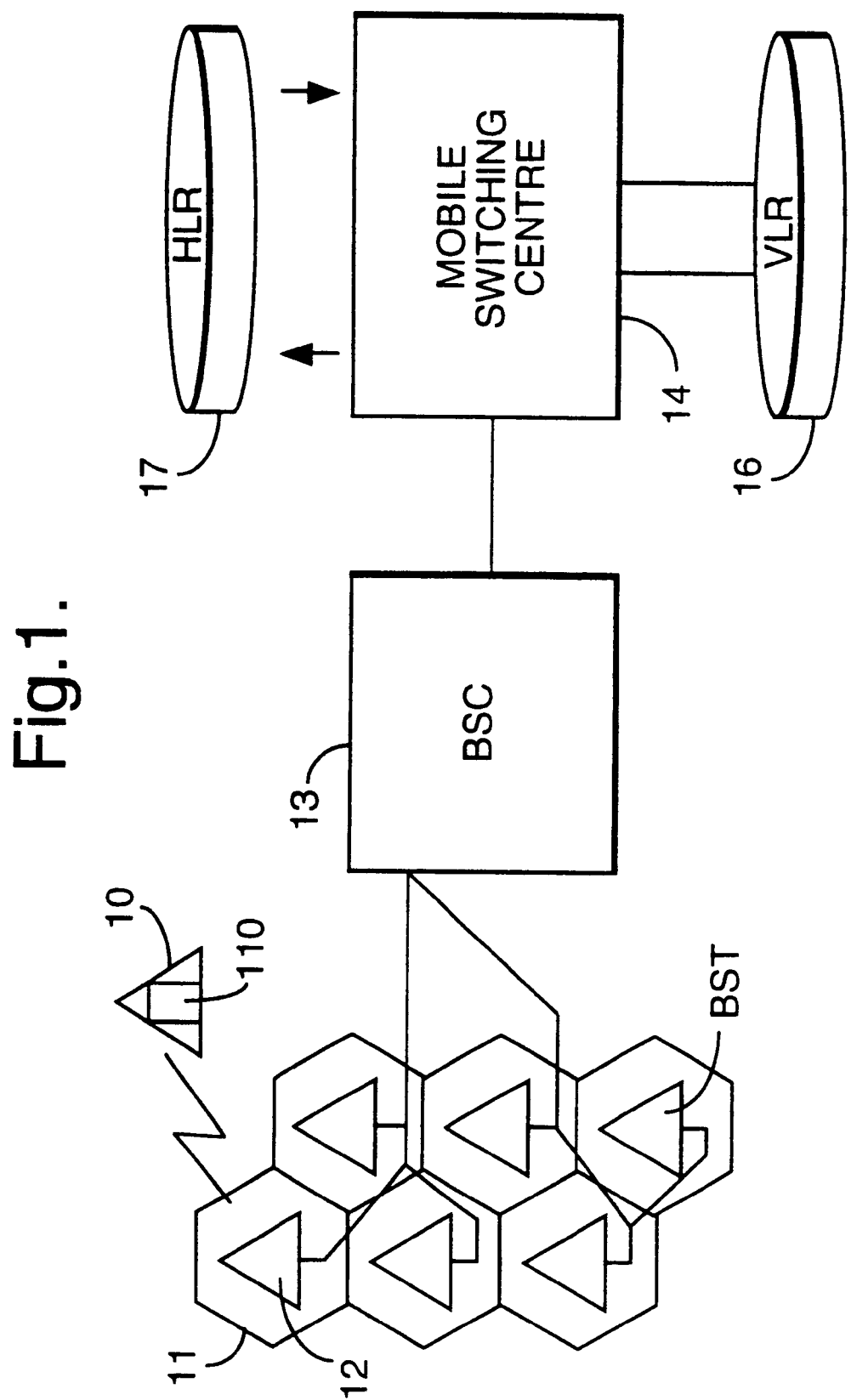
FIG. 1 is a schematic diagram of a mobile communication system.

Referring to FIG. 1, there is depicted in highly schematic form part of a mobile cellular communications network or system. The service area of the system is subdivided into a plurality of contiguous cells 11 in each of which mobiles 10 are serviced via a respective base station 12. Operation of a group of base stations 12 is controlled via a base station controller 13 and, in turn, a number of base station controllers are serviced by a mobile switching centre (MSC) 14 which may provide an interface to the public telecommunications network. With this arrangement, the mobile switching centre 14 may service, via the base station controllers 13 and the base stations 12, typically over one hundred individual cells 11. Information relating to the mobiles 10 within the service area of the mobile switching centre 14 is stored in a visitors location register or database 16 associated with the switching centre. The system also incorporates a master database 17 of subscriber information, this master database commonly being referred to as a home location register (HLR). When a mobile enters the service area of the MSC 14 it registers with that MSC. As part of the registration procedure, information relating to that mobile is retrieved from the home location register and stored in the visitors location register.

In the system of FIG. 1, each mobile terminal 10 requires the insertion of a respective card or subscriber identity module 110 bearing unique, subscriber specific information that is used to authorise access to the system by the terminal. This information includes a subscriber identification code which, in the GSM system, is referred to as the international mobile subscriber identity (IMSI). From time to time, this card will require replacement, the procedure for which will be described below.

Figure 2:
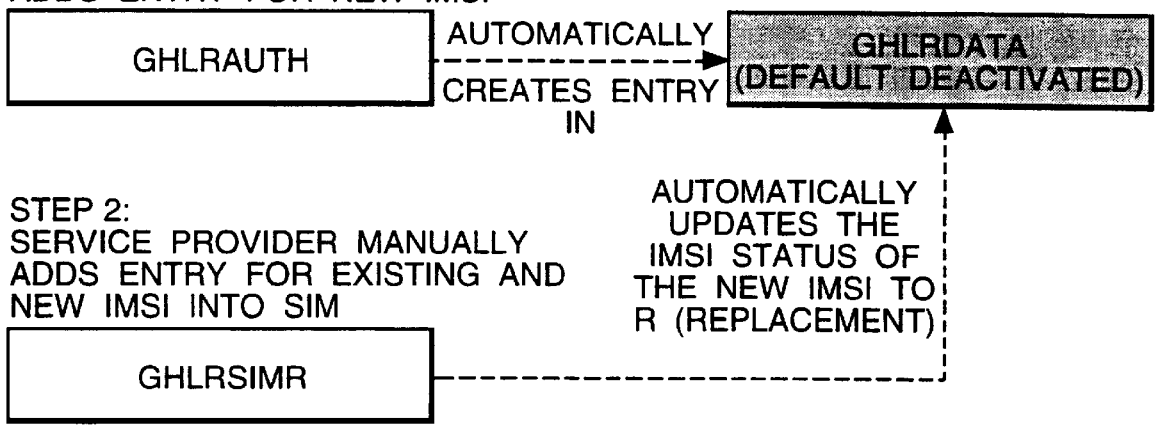
FIG. 2 is a flow chart illustrating the procedure for facilitating card replacement in the system of FIG. 1.

Referring now to FIG. 2, the home location register incorporates a first table GHLRAUTH containing a list of the currently authorised subscriber identities or IMSIs. A second table GHLRDATA contains this list together with a status indication for each entry. A third table GHLRSIMR provides for correlation between an existing IMSI and a new IMSI with which it is to be replaced. When a subscriber card is to be replaced, the new IMSI for this replacement card is added by the system operator to the table GHLRAUTH in the same way that the IMSI of a new subscriber would be entered. This causes automatic addition of an entry in table GHLRDATA for this IMSI together with a status indicator D indicating that the IMSI is currently deactivated. The new IMSI is next added to table GHLRSIMR. This causes the status indicator for the IMSI in table GHLRDATA to be changed to R indicating a replacement. The arrangement is such that the new IMSI cannot be entered in table GHLR-SIMR unless its status indicator in table GHLRDATA has already been set to D, i.e. deactivated. Also, once a new IMSI has been added to the table GHLRSIMR, the operator is prevented from provisioning any basic or supplementary services against it while the current IMSI is still active. Of course, no such restriction applies to the current IMSI. However, both IMSIs must be present in both the GHLR-AUTH and GHLRDATA tables before entry of the new IMSI in the GHLRSIMR table.

When adding an entry to the table GHLRSIMR, the following information is provided:

The new IMSI.

The current IMSI.

An option code used to indicate the manner in which the change is to be effected.

The activation time, i.e. the time from which the new card may be used.

The invocation time, i.e. the time from which the new card must be used and the current card becomes invalid.

There are three options available for performing the changeover of cards. These are scheduled changeover, user triggered changeover and forced changeover. The way in which these options are performed will be discussed below.

Figure 3:
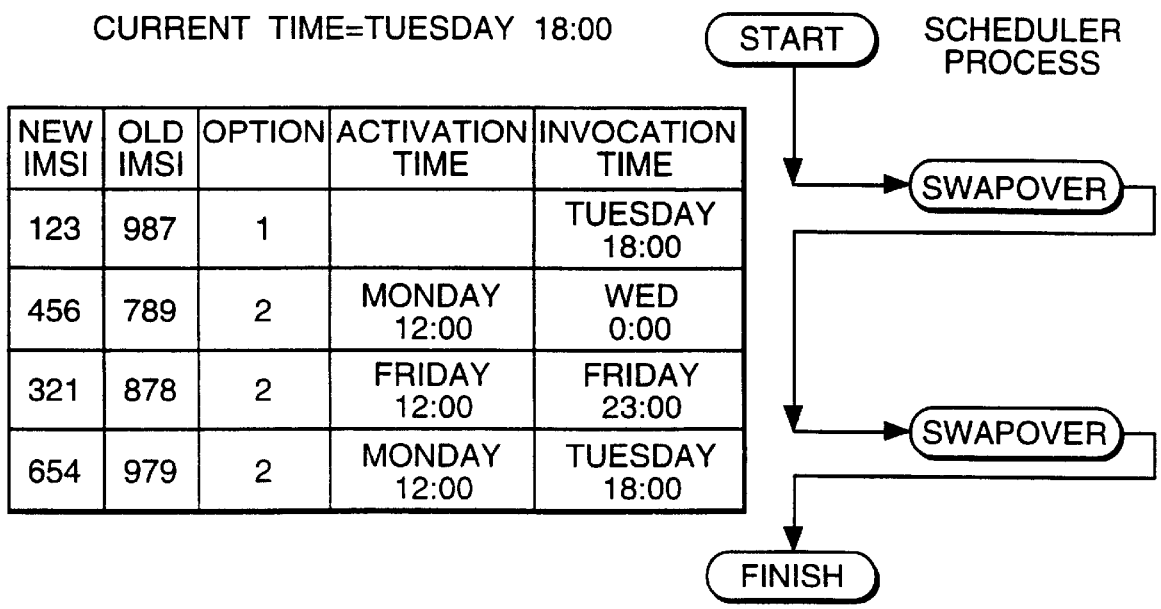
FIG. 3 is a flow chart illustrating a scheduling procedure for effecting subscriber IMSI record updating in the system of FIG. 1.

Scheduled changeover is the preferred method of operation and is the simplest way of managing SIM card replacement. The operator datafills the new IMSI and the current IMSI in the GHLRSIMR store, sets the option field to FIXED and specifies an invocation time which determines the earliest time at which the changeover may take place. A scheduler is used to determine the precise time at which changeover is to occur and processes all GHLRSIMR entries with that time stamp or an earlier time stamp. The functioning of the scheduler is illustrated in the flow chart of FIG. 3. At regular intervals, e.g. every hour, the scheduler scans the GHLRSIMR table looking for entries whose invocation time has been reached. When such an entry is found, i.e. it is determined that the new SIM card (IMSI+Ki) is to become the active one the changeover procedure is initiated. The changeover is effected by making the new IMSI use the records previously used by the old IMSI. After changeover, the memory previously associated with the new IMSI is deallocated and the old IMSI is removed from level indexing. The tasks performed at changeover are as follows.

1. Copy the authentication data and IMSI from the new IMSI record into that of the old IMSI.

2. Wipe out the unprotected data in the old IMSI record.

3. Copy the old IMSI and old location data into the record used by the new IMSI and mark the record as deleted.

4. Exchange the Subscriber Access Index stored in level indexing for the two IMSIs; i.e. the new IMSI is now mapped to the Subscriber Access Indexes associated with the old IMSI and vice versa.

If the audit is not completed within the allocated time period, e.g. within one hour, the procedure is terminated and the next hourly audit is invoked. Thus, during busy periods, some changeovers may be delayed until a later audit.

In a preferred embodiment, we reduce the time that would be wasted by performing the hourly audit when there is no useful work to be done, i.e. there is no IMSI currently requiring updating. This is achieved by the use of the following time stamps.

EARLY_ACT_STAMP: This time stamp records the earliest activation time (after the present) of a GHLRSIMR entry. When adding an entry to GHLRSIMR, if the activation time is earlier than the current value then GHLRSIMR is updated with the new value.

EARLY_INV_STAMP: This time stamp records the earliest invocation time of a GHLRSIMR entry. EARLY_INV_STAMP is updated in a similar way as EARLY_ACT_STAMP except that the invocation time is checked.

To make use of the two time stamps, the scheduler effects two checks before scanning the GHLRSIMR.

If EARLY_ACT_STAMP is later than the present time, the table is the OM (SMPREND)

If EARLY_INV_STAMP is later than the present time then the table is not scanned to find IMSIs to changeover.

User triggered changeover is a flexible way of managing SIM replacement giving the subscriber the choice, within limits, of when the changeover is to take place. The subscriber triggers the changeover by replacing the old SIM card with the new card in the handset thus initiating an update location. The operator datafills the new IMSI and the current IMSI in the GHLRSIMR, sets the option field to USER and provides the activation and invocation times. The activation time is the time from which the subscriber is permitted to trigger the changeover. The invocation time is the time at which the changeover is scheduled to take place if the subscriber has not yet triggered the changeover by insertion of the new card.

Forced changeover is used in the exceptional circumstances that changeover must be effected immediately. The operator sets up the subscriber for scheduled or user triggered changeover as described above. Once the new IMSI has been added to GHLRSIMR, the operator may trigger the changeover immediately.

It will be understood that although the above card replacement technique has been described with particular reference to the GSM mobile system, it is by no means limited to use with that particular system but is of general application to mobile systems.

What is claimed is:

1. A method of effecting subscriber identity card replacement in a mobile communications network in which each subscriber is allocated a unique identity code that is associated with information stored on the card, the method including storing a current identity code together with respective subscriber details as a first record in a first store, storing said current subscriber identity code in a second store together with a status indicator indicating an active nature of that identity code, creating a replacement identity code for said subscriber, storing said replacement code in said first store together with the subscriber details as a second record, storing said replacement subscriber identity code in the second store together with a status indicator indicating a de-activated nature of that identity code, storing in a third store data incorporating timing information and providing a correlation between the replacement subscriber identity code and the current subscriber identity code allocated to that subscriber, changing the status indicator of the replacement code to indicate a replacement nature of the replacement code in the second store, and, at a time determined from said timing information in said third store, exchanging said current and replacement subscriber identity codes between said first and second records so as to associate the replacement subscriber identity code with the subscriber details in the first record, activating the replacement subscriber identity code and deleting said second record so as to maintain the first record containing the replacement subscriber identity code as the sole active record.

2. A method as claimed in claim 1, wherein a new subscriber identity code can be entered into the third store only if that identity code together with the corresponding existing code which it is to replace are present in both the first and second stores and the status indicator of that code in the second store is indicative of a deactivated condition of that code.

3. A method as claimed in claim 2, wherein each new subscriber identity code stored in the third store is provided with a corresponding option code indicative of the manner in which that new code is to replace the corresponding existing code.

4. A method as claimed in claim 3 wherein a network scheduler initiates the step of associating the new identity code with the corresponding subscriber details.

5. A method as claimed in claim 4 wherein the timing information determines a time after which a subscriber can initiate the step of associating the new identity code with the corresponding subscriber details.

6. A method as claimed in claim 5 wherein the timing information further determines a time after which, if the subscriber has not initiated the associating step, a network scheduler initiates the associating step.

7. An arrangement for effecting subscriber identity card replacement in a mobile communications network in which each subscriber is allocated a unique identity code that is associated with information stored on the card, the arrangement including a first store for storing a current identity code together with respective subscriber details as a first record and for storing a replacement code in said first store together with the subscriber details as a second record, a second store for storing said current subscriber identity code together with a status indicator indicating an active nature of that identity code and for storing said replacement subscriber identity code together with a status indicator indicating a de-activated nature of that identity code, a third store for storing data incorporating timing information and providing a correlation between the replacement subscriber identity code and the current subscriber identity code allocated to that subscriber, means for changing the status indicator of the replacement identity code to indicate a replacement nature of the replacement code in the second store, means for exchanging, at a time determined from said timing information, said current and replacement subscriber identity codes between said first and second records so as to associate the replacement subscriber identity code with the subscriber details in the first record, and means for deleting said second record so as to maintain the first record containing the replacement subscriber identity code as the sole active record.

* * * * *